(12) United States Patent
Kunkes et al.

(10) Patent No.: US 12,053,763 B2
(45) Date of Patent: Aug. 6, 2024

(54) ALUMINOSILICATE ZEOLITE INTERGROWTHS

(71) Applicant: BASF Corporation, Florham Park, NJ (US)

(72) Inventors: Eduard Kunkes, Iselin, NJ (US); Ahmad Moini, Iselin, NJ (US); Maritza Ortega, Haledon, NJ (US)

(73) Assignee: BASF Corporation, Florham Park, NJ (US)

( * ) Notice: Subject to any disclaimer, the term of this patent is extended or adjusted under 35 U.S.C. 154(b) by 517 days.

(21) Appl. No.: 17/309,167

(22) PCT Filed: Nov. 1, 2019

(86) PCT No.: PCT/US2019/059348
§ 371 (c)(1),
(2) Date: May 3, 2021

(87) PCT Pub. No.: WO2020/096887
PCT Pub. Date: May 14, 2020

(65) Prior Publication Data
US 2021/0370280 A1  Dec. 2, 2021

Related U.S. Application Data

(60) Provisional application No. 62/756,109, filed on Nov. 6, 2018.

(51) Int. Cl.
| | | |
|---|---|---|
| *B01J 29/80* | (2006.01) | |
| *B01J 6/00* | (2006.01) | |
| *B01J 29/76* | (2006.01) | |
| *B01J 35/61* | (2024.01) | |
| *B01J 37/04* | (2006.01) | |
| *B01J 37/08* | (2006.01) | |
| *C01B 39/46* | (2006.01) | |
| *F01N 3/08* | (2006.01) | |
| *F01N 3/20* | (2006.01) | |

(52) U.S. Cl.
CPC .............. *B01J 29/763* (2013.01); *B01J 6/001* (2013.01); *B01J 35/615* (2024.01); *B01J 35/617* (2024.01); *B01J 37/04* (2013.01); *B01J 37/08* (2013.01); *C01B 39/46* (2013.01); *F01N 3/0842* (2013.01); *F01N 3/2066* (2013.01); *C01P 2002/72* (2013.01); *C01P 2006/12* (2013.01); *F01N 2250/12* (2013.01); *F01N 2570/14* (2013.01)

(58) Field of Classification Search
CPC ....... Y02C 20/10; C01B 39/023; C01B 39/04; C01B 39/46; B01D 53/9418; B01D 2255/50; C01P 2002/72; C01P 2006/12; F01N 3/0842; F01N 3/2066; F01N 2250/12; F01N 2570/14; B01J 6/001; B01J 29/763; B01J 29/80; B01J 35/00; B01J 35/1019; B01J 35/1023; B01J 37/04; B01J 37/08
USPC ........ 502/60, 64, 67, 69; 423/700, 701, 702, 423/703, 704, 709
See application file for complete search history.

(56) References Cited

U.S. PATENT DOCUMENTS

| | | |
|---|---|---|
| 2005/0154244 A1 | 7/2005 | Cao et al. |
| 2006/0135349 A1 | 6/2006 | Mertens et al. |
| 2007/0100185 A1 | 5/2007 | Cao et al. |
| 2012/0201731 A1 | 8/2012 | Ballinger et al. |

FOREIGN PATENT DOCUMENTS

| | | |
|---|---|---|
| CN | 103298557 A | 9/2013 |
| EP | 3222583 A1 | 9/2017 |
| WO | WO 2018-113566 A1 | 6/2018 |
| WO | WO 2020-096887 A1 | 5/2020 |

OTHER PUBLICATIONS

International Search Report, dated Feb. 26, 2020, for International Application No. PCT/US2019/069348.

*Primary Examiner* — Elizabeth D Wood
(74) *Attorney, Agent, or Firm* — DLA Piper LLP (US)

(57) ABSTRACT

The present disclosure provides a method of making zeolite intergrowths. In one embodiment, the present disclosure provides a method of making an AEI-based material, including the steps of: preparing a mixture of water, an alumina source, a silica source, a CHA structure directing agent, and an AEI structure directing agent, wherein the molar ratio of the CHA structure directing agent to the AEI structure directing agent is from about 1:1 to about 1:15; heating the mixture at a temperature sufficient to promote formation of crystals; and calcining the crystals at a temperature of from about 450° C. to about 750° C. to obtain a product, wherein no halide-containing reagent is employed. The AEI-based materials of the present disclosure may find particular use in selective catalytic reduction of $NO_x$ in exhaust gas streams.

23 Claims, 10 Drawing Sheets

ALUMINOSILICATE ZEOLITE INTERGROWTHS

This application is a U.S. national stage entry application under 35 U.S.C. § 371 from PCT International Application No. PCT/US2019/059348, filed on Nov. 1, 2019, which claims priority to U.S. Provisional Application No. 62/756,109, filed on Nov. 6, 2018; the contents of each of the applications is incorporated herein by reference in its entirety.

FIELD OF THE INVENTION

The present disclosure relates to zeolites and catalyst compositions comprising such zeolites, and to methods for the preparation and use of such zeolites and catalyst compositions, and to catalyst articles and systems employing such catalyst compositions.

BACKGROUND OF THE INVENTION

The harmful components of nitrogen oxides ($NO_x$) led to atmospheric pollution. Nitrogen oxides are contained in exhaust gases from internal combustion engines such as automobiles and trucks; from combustion installations such as power stations heated by natural gas, oil, or coal; and from nitric acid production plants.

Various treatment methods have been used for the treatment of $NO_x$-containing gas mixtures to decrease atmospheric pollution. One type of treatment involves catalytic reduction of nitrogen oxides. There are two processes: (1) a nonselective reduction process wherein carbon monoxide, hydrogen, or a lower hydrocarbon is used as a reducing agent; and (2) a selective reduction process wherein ammonia or an ammonia precursor is used as a reducing agent. In the selective reduction process, a high degree of nitrogen oxide removal can be achieved with a small amount of reducing agent.

The selective reduction process is referred to as a SCR (Selective Catalytic Reduction) process. The SCR process uses catalytic reduction of nitrogen oxides with a reductant in the presence of atmospheric oxygen. Nitrogen and steam are the predominant products when ammonia is used as the reductant as shown below.

$4NO + 4NH_3 + O_2 \rightarrow 4N_2 + 6H_2O$     (standard SCR reaction)

$2NO_2 + 4NH_3 \rightarrow 3N_2 + 6H_2O$     (slow SCR reaction)

$NO + NO_2 + NH_3 \rightarrow 2N_2 + 3H_2O$     (fast SCR reaction)

Catalysts employed in the SCR process ideally should be able to retain good catalytic activity over a wide range of temperature conditions of use, for example, 200° C. to 600° C. or higher, under hydrothermal conditions. SCR catalysts are commonly employed in hydrothermal conditions, such as during the regeneration of a soot filter, a component of the exhaust gas treatment system used for the removal of particles.

Molecular sieves such as zeolites have been used in the selective catalytic reduction of nitrogen oxides with a reductant such as ammonia, urea, or a hydrocarbon in the presence of oxygen. Zeolites are crystalline materials having rather uniform pore sizes which, depending upon the type of zeolite and the type and amount of cations included in the zeolite lattice, range from about 3 to about 10 Angstroms in diameter. Zeolites having 8-ring pore openings and double-six ring secondary building units, particularly those having cage-like structures, have recently been studied for use as SCR catalysts. Metal-promoted zeolite catalysts including, among others, iron-promoted and copper-promoted zeolite catalysts, for the selective catalytic reduction of nitrogen oxides with ammonia are known.

One exemplary zeolite that has been shown to be an effective catalyst for selective catalytic reduction of $NO_x$ with $NH_3$ is a zeolite with an AEI framework, and in particular, a metal-exchanged zeolite (e.g., copper-exchanged) with an AEI framework. Recipes for the industrial production of aluminosilicate AEI zeolites suffer from a low gel solids content, as well as incomplete silica conversion. These factors complicate commercialization of such recipes due to low space-time yields and formation of a silica-rich waste stream, respectively. An additional disadvantage is the high cost of production by using Y-zeolite (FAU) in AEI zeolite preparations as an aluminum source. As such, there is a need for methods of making small pore zeolites, such as AEI, that are efficient, environmentally safe, and low cost, but that also provide materials with suitable properties, for example, for SCR catalysts.

SUMMARY OF THE INVENTION

The present disclosure describes methods for producing zeolite-based materials. In particular, the disclosure describes methods for producing intergrowths of two or more zeolites with different frameworks, such as intergrowths of AEI frameworks and other frameworks (e.g., CHA frameworks), and in particular, to aluminosilicate zeolite intergrowths of such frameworks. Such intergrowths can, in some embodiments, exhibit high AEI framework character, as will be outlined in further detail herein. Advantageously, intergrowths disclosed herein (e.g., AEI-CHA intergrowths) may be incorporated within catalyst compositions, which can exhibit selective catalytic reduction (SCR) activity comparable to that exhibited by catalyst compositions incorporating AEI framework zeolites prepared by traditional methods.

In one aspect, the disclosure provides a method of making an AEI-based material, comprising: preparing a mixture of water, an alumina source, a silica source, a CHA structure directing agent, and an AEI structure directing agent, wherein the molar ratio of the CHA structure directing agent to the AEI structure directing agent is from about 1:1 to about 1:15; heating the mixture at a first temperature sufficient to promote formation of crystals; and calcining the crystals at a second temperature of from about 450° C. to about 750° C. to obtain the AEI-based material, wherein no halide-containing reagent is employed.

In another aspect, the disclosure provides a method of improving efficiency of producing an AEI-based material, comprising: preparing a mixture of water, an alumina source, a silica source, a CHA structure directing agent, and a AEI structure directing agent, wherein the molar ratio of the CHA structure directing agent to the AEI structure directing agent is from about 1:1 to about 1:15; heating the mixture at a temperature sufficient to promote formation of crystals; and calcining the crystals at a second temperature of from about 450° C. to about 750° C., wherein no halide-containing reagent is employed.

In some embodiments, the method further comprises formulating the AEI-based material into a SCR catalyst composition. The disclosure further provides a method of reducing NOx in an exhaust gas stream, comprising contacting the exhaust gas stream with a SCR catalyst composition comprising the AEI-based material prepared according to the methods disclosed herein, wherein the SCR catalyst composition reduces NOx levels in the exhaust gas stream by at least 50%. The disclosure additionally provides an AEI-based material prepared according to the disclosed methods, wherein the AEI-based material comprises an AEI-CHA intergrowth with an AEI character of about 75% to about 95% and about 5% to about 85% phase pure CHA. The disclosure further provides an SCR catalyst composition comprising the AEI-based material.

BRIEF DESCRIPTION OF THE DRAWINGS

Reference is made to the appended drawings to provide an understanding of embodiments of the invention, which are not necessarily drawn to scale, and in which reference numerals refer to components of exemplary embodiments of the invention. The drawings are exemplary only, and should not be construed as limiting the invention.

DETAILED DESCRIPTION OF THE INVENTION

Figure 1A:
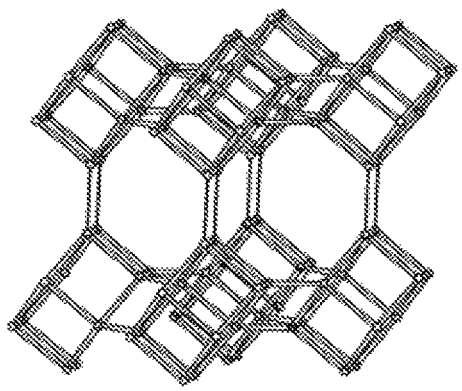
FIGS. 1A and 1B are depictions of the connection modes of CHA frameworks and AEI frameworks, respectively

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates.

In one aspect, the present disclosure provides a method of making an AEI-based material, comprising: preparing a mixture of water, an alumina source, a silica source, a CHA structure directing agent, and an AEI structure directing agent, wherein the molar ratio of the CHA structure directing agent to the AEI structure directing agent is from about 1:1 to about 1:15; heating the mixture at a first temperature sufficient to promote formation of crystals; and calcining the crystals at a second temperature of from about 450° C. to about 750° C. to obtain the AEI-based material, wherein no halide-containing reagent is employed.

In another aspect, the disclosure provides a method of improving efficiency of producing an AEI-based material, comprising: preparing a mixture of water, an alumina source, a silica source, a CHA structure directing agent, and a AEI structure directing agent, wherein the molar ratio of the CHA structure directing agent to the AEI structure directing agent is from about 1:1 to about 1:15; heating the mixture at a temperature sufficient to promote formation of crystals; and calcining the crystals at a second temperature of from about 450° C. to about 750° C., wherein no halide-containing reagent is employed.

The specific reagents employed in the disclosed methods can vary. For example, in some embodiments, the CHA structure directing agent is selected from the group consisting of an N,N,N-trimethyl-1-adamantammonium compound, an N,N,N-trimethyl-2-adamantammonium compound, an N,N,N-trimethylcyclohexylammonium compound, an N,N-dimethyl-3,3-dimethylpiperidinium compound, an N,N-methylethyl-3,3-dimethylpiperidinium compound, an N,N-dimethyl-2-methylpiperidinium compound, a 1,3,3,6,6-pentamethyl-6-azonio-bicyclo(3.2.1)octane compound, N,N-dimethylcyclohexylamine, bi- and tri-cyclic nitrogen containing organic compounds, and combinations thereof. One exemplary CHA structure directing agent is trimethyl-1-adamantylammonium hydroxide (TMAda). In some embodiments, the AEI structure directing agent is a N,N-diethyl-2,6-dimethylpiperdinium compound, a N,N-dimethyl-2,6-dimethylpiperdinium compound, or a combination thereof. One exemplary AEI structure directing agent is 1,1,3,5-tetramethylpiperidinium hydroxide (TMP).

In some embodiments, the solids content is from about 12% to about 30%, or from about 12% to about 25%, or from about 15% to about 25%, or from about 17% to about 20%.

In some embodiments, the methods disclosed herein provide a higher silica yield incorporation than conventional methods. For example, in some embodiments, the method results in a silica yield of about 50% or greater. In some embodiments, the method results in a silica yield of about 75% or greater or about 90% or greater. In certain embodiments, the method results in a silica yield of from about 92% to about 94%. In some embodiments, the first temperature is from about 140° C. to about 200° C. The heating step, in some embodiments, comprises heating the mixture for about 30 to about 80 hours. The method may, in certain embodiments, further comprise filtering crystals formed during the heating step.

The alumina source, in some embodiments, is non-zeolitic. However, the disclosure is not limited thereto; in some embodiments, the alumina source is zeolitic. In certain embodiments, the alumina source is selected from the group consisting of aluminum alkoxides (e.g., aluminum triisopropoxide), aluminum hydroxides, aluminum oxides, and aluminum metal. In some embodiments, the mixture is prepared under basic pH conditions. For example, in certain embodiments, the pH is about 12 to about 13. The silica source, in some embodiments, is selected from the group consisting of silicates, precipitated silica, colloidal silica, silica gels, dealuminated zeolites, silicon hydroxides, silicon alkoxides, fumed silica, and combinations thereof.

The resulting AEI-based material product comprises a large fraction of AEI-CHA intergrowth, and the intergrowths comprises a highAEI character. For example, in some embodiments, the AEI-based material comprises an intergrowth having an AEI character of about 75% to about 95%. In some embodiments, the intergrowth has an AEI character of about 75% to about 90%, or about 75% to about 85%, or about 80% to about 95%, or about 85% to about 95%, or about 90% to about 95%. In some embodiments, the intergrowth has an AEI character of at least 90%, or about 95% to about 99%.

In some embodiments, the AEI-based material comprises crystals having AEI-CHA intergrowths and crystals that are phase pure CHA. The amount of AEI-CHA intergrowths comprising the AEI-based material is from about 15% to about 95% by weight. Accordingly, the AEI-based material comprises from about 5% to about 85% by weight crystals that are pure CHA, that is, crystals having no intergrowths (negligible stacking fault density). The AEI-based material, in some embodiments, has a ZSA of about 500 to about 550 $m^2/g$. In some embodiments, the AEI-based material has a SAR of about 10 to about 25. In some embodiments, the disclosed method further comprises exchanging a promoter metal into the product. The promoter metal can be, for example, selected from Cu, Co, Ni, La, Mn, Fe, V, Ag, Ce, Nd, Mo, Hf, Y, W, and combinations thereof. The amount of optional promoter metal present in the AEI-based material can vary and, in some embodiments is present in an amount of about 0.01 wt. % to about 15 wt. % based on the weight of the metal-promoted AEI-based material.

In some embodiments, the method further comprises formulating the AEI-based material into a SCR catalyst composition. The disclosure further provides a method of reducing NOx in an exhaust gas stream, comprising contacting the exhaust gas stream with a SCR catalyst composition comprising the AEI-based material prepared according to the methods disclosed herein, wherein the SCR catalyst composition reduces NOx levels in the exhaust gas stream by at least 50%. The disclosure additionally provides an AEI-based material prepared according to the disclosed methods, wherein the AEI-based material comprises an AEI-CHA intergrowth with an AEI character of about 75% to about 95% and about 5% to about 85% pure CHA. The disclosure further provides an n SCR catalyst composition comprising the AEI-based material.

Framework Intergrowths

The disclosure generally provides materials comprising intergrowths of two or more zeolitic frameworks. In particular, the disclosure provides methods of producing materials comprising intergrowths with substantial AEI framework character, e.g., AEI-CHA intergrowths. FAU, as will be described more fully herein, are zeolitic materials comprising both a primary zeolitic framework component (e.g., AEI) as well as a secondary zeolitic framework component (e.g., CHA). The CHA or AEI character of an intergrowth is determined from the stacking fault probability of D6R layers that comprise the respective framework. In some embodiments, methods are provided which provide materials with substantial AEI character (and which can provide catalytic activity comparable to conventional AEI zeolites) via a more efficient method than that used for conventional AEI zeolite preparation. In particular embodiments, the intergrowths provided herein are aluminosilicate zeolitic intergrowths.

Zeolites are a type of "molecular sieve," which are framework materials that may be used, e.g., in particulate form, in combination with one or more promoter metals, as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size.

As used herein, the term "zeolite" refers to a specific example of a molecular sieve, further including silicon and aluminum atoms. Reference to an aluminosilicate zeolite structure type limits the material to molecular sieves that do not purposely include phosphorus or other metals substituted in the framework. To be clear, as used herein, "aluminosilicate zeolite" excludes aluminophosphate materials such as SAPO, AlPO, and MeAPO materials, and the broader term "zeolite" is intended to include aluminosilicates and aluminophosphates. Zeolites are crystalline materials, understood to be aluminosilicates with open 3-dimensional framework structures composed of corner-sharing $TO_4$ tetrahedra, where T is Al or Si. Zeolites generally comprise silica to alumina (SAR) molar ratios of 2 or greater. Zeolites for use in the disclosed catalyst compositions are not particularly limited in terms of SAR values, although the particular SAR value associated with a zeolite may, in some embodiments, affect the SCR performance of the catalyst composition into which it is incorporated (e.g., particularly after aging). In some embodiments, the SAR values of the zeolites are from about 5 to about 100 or about 5 to about 50. In some embodiments, the SAR is 5 to 25 and, in other embodiments, the SAR is 25-50.

Cations that balance the charge of the anionic framework are loosely associated with the framework oxygens, and the remaining pore volume is filled with water molecules. The non-framework cations are generally exchangeable, and the water molecules removable. Zeolites typically have rather uniform pore sizes which, depending upon the type of zeolite and the type and amount of cations included in the zeolite lattice, range from about 3 to 10 Angstroms in diameter.

Zeolites can be classified by means of the framework topology by which the structures are identified. As referenced herein above, the present disclosure relates specifically to materials prepared from zeolites having frameworks of AEI and CHA, i.e., AEI-CHA intergrowths. Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. AEI and CHA frameworks have a "double 6-ring" (d6r) secondary building unit, and the disclosed AEI-CHA intergrowths similarly can have a d6r secondary building unit. A d6r secondary building unit has twelve tetrahedral atoms, and is created by joining two "single s6r units" where the "6" denotes the positions of tetrahedral silicon and aluminum atoms, and the oxygen atoms are located between tetrahedral atoms). In particular embodiments, CHA framework zeolites are selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

Both AEI and CHA can also be described as small pore zeolites, and the resulting intergrowths disclosed herein can also be described as such. A small pore zeolite contains channels defined by up to eight tetrahedral atoms. The phrase "8-ring" zeolite refers to a zeolite having 8-ring pore openings and double-six ring (d6r) secondary building units and having a cage like structure resulting from the connection of double six-ring building units by 4 rings.

Figure 1B:
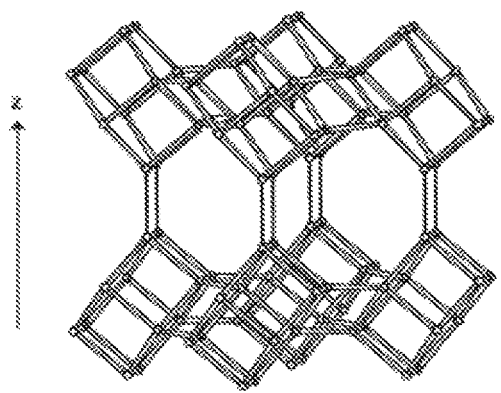

A given type of zeolite has a particular arrangement of such building units. For example, in the case of regular AEI and CHA framework zeolites, for example, the periodic building unit is a double six ring (d6r) layer, as referenced above. These layers, referred to herein as "A" and "B", are topologically identical except that "B" is the mirror image of "A." When layers of the same type stack on top of one another, e.g., forming an AAAAAA stack or a BBBBBB stack, a zeolite with a CHA framework is generated. When layers "A" and "B" alternate, i.e., forming an ABABABAB stack, a zeolite with an AEI framework is generated. This distinction between CHA and AEI frameworks can be understood by reference to FIGS. 1A and 1B. FIG. 1A depicts the connection mode of d6r units in a CHA framework, and FIG. 1B depicts the connection mode of d6r units in an AEI framework, viewed along the x axis. See Database of Zeolite Structures at http://America.iza-structure.org, which is incorporated herein by reference.

Figure 2:
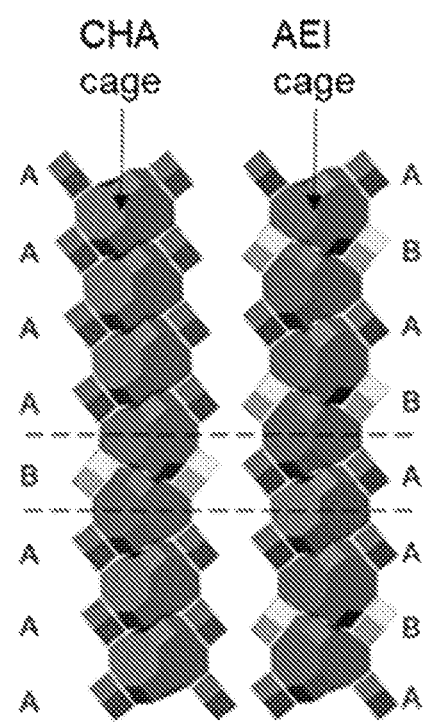
FIG. 2 is a depiction of stacking of d6r layers in CHA and AEI zeolite frameworks, depicting planar stacking defects, characteristic of AEI-CHA intergrowths (adapted from Smith et al., Chem. Mater. 2015, 27, 4205-4215, which is incorporated herein by reference).

An intergrowth of two framework types comprises sub-units derived from two different framework types. For example, AEI-CHA intergrowths comprise regions of CHA framework sequences (with identical "A" or "B" stacked layers) and regions of AEI framework sequences (with alternating "ABAB" layers). Each change from a CHA to an AEI framework type sequence results in a stacking fault (generally considered to be a disorder in the structure). In addition, stacking faults can occur in a pure CHA phase material when a sequence of one layer type (mirror image) intersects a sequence of the other layer type (opposite mirror image), such as, for example, in a structure represented as AAAABBBB. Stacking faults can be understood by reference to FIG. 2, wherein the left column depicts a stacking fault in a CHA framework (from units stacked in an A configuration to a unit stacked in a B configuration, and then back to units stacked in an A configuration), and the right column depicts a stacking fault in an AEI framework (from units stacked in a repeating AB configuration to units stacked in an AA configuration, and then back to units stacked in a repeating AB configuration).

A fault in either an AEI or CHA sequence represents a transition from AEI to CHA or vice versa, and the stacking fault probability determines the AEI or CHA character of an intergrowth, whereby a probability of 50% would represent completely random stacking of A and B layers. Probabilities can be specified between layer transitions and correlated with powder diffraction patterns of intergrowth phases with varying AEI character. See, e.g., Treacy et al. *Proceedings of the Royal Chemical Society* 1991 433 499-520, which is incorporated herein by reference.

Typically, the character of the materials comprising intergrowths disclosed herein can be described as being primarily one type of framework. For example, in particular embodiments, the disclosed materials comprising AEI-CHA intergrowths and/or the AEI-CHA intergrowths themselves are provided that are primarily AEI in character. For example, in some embodiments, they have about 50% or greater AEI character, about 60% or greater AEI character, about 70% or greater AEI character, about 80% or greater AEI character, or about 90% or greater AEI character. In some embodiments, the disclosed intergrowths are AEI-CHA intergrowths, and the resulting materials comprising such intergrowths are AEI-based materials. The AEI character can also be described as exhibiting an AEI:CHA ratio, and the ratio is about 1:1 or greater; about 2:1 or greater, about 3:1 or greater, about 4:1 or greater, about 5:1 or greater, about 10:1 or greater, about 15:1 or greater, about 20:1 or greater, or about 25:1 or greater. In some embodiments, the AEI:CHA ratio is greater than about 80:1. In some embodiments, the AEI:CHA ratio is from about 70:30 to about 95:5. In addition, in some embodiments, the materials and intergrowths disclosed herein can comprise a plurality of intergrown phases, each having a different AEI:CHA ratio.

Figure 3:
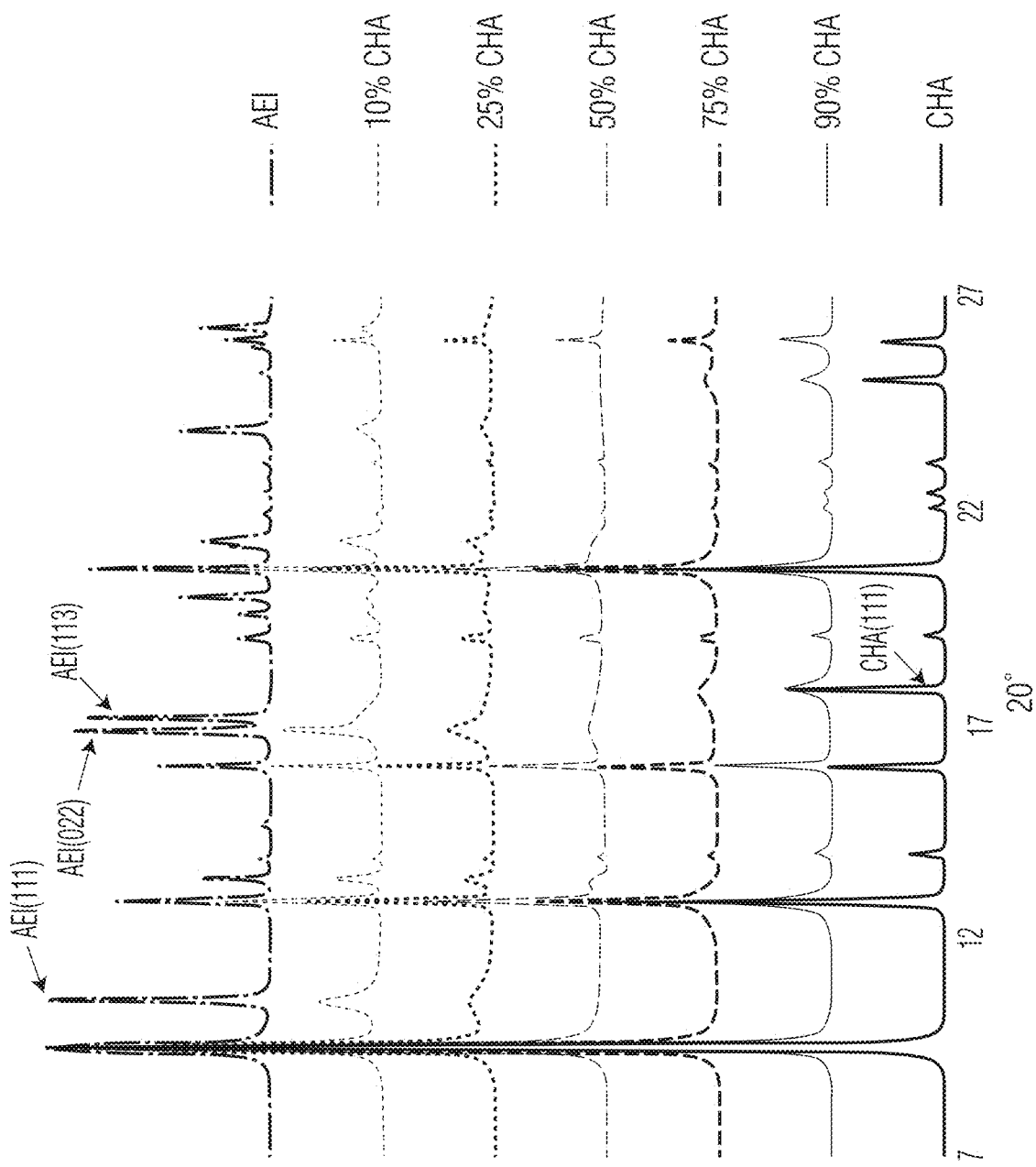
FIG. 3 is a powder diffraction of simulated (DIFFaX) patterns of AEI-CHA intergrowths with varying stacking fault probabilities.

Percent character or AEI:CHA ratio is determined, e.g., via powder diffraction patterns. Specifically, experimental powder diffraction patterns for the intergrowths disclosed herein can be compared against simulated powder diffraction patterns, e.g., using DIFFax, which is a computer program based on a mathematical model for simulating powder diffraction patterns from crystals containing planar faults, selected by and available from the International Zeolite Association to simulate XRD powder patterns for intergrown phases of zeolites. See Treacy et al., Proceedings of the Royal Chemical Society 1991, 433:499-520, which is incorporated herein by reference. nThe simulated patterns are shown in FIG. 3 and can also be found in the *Collection of Simulated XRD Patterns for Zeolites*. See Treacy and Higgins, *Collection of Simulated XRD Powder Patterns for Zeolites*, Fifth Edition Elsevier 2007, which is incorporated herein by reference in its entirety.

The presence of a material or intergrowth with a high AEI character can further, in some embodiments, be confirmed via scanning electron microscopy (SEM) or transmission electron microscopy (TEM). Typically, CHA-based material exhibits a cubic habit, whereas AEI-based material exhibits a prismatic habit. An increasing amount of prismatic structures seen in SEM of an intergrowth material can, in some embodiments, indicate higher AEI character.

Although the application focuses on AEI-CHA intergrowths and materials comprising such types of intergrowths, it is noted that the methods outlined herein may be applicable to intergrowths of other zeolite framework structures, e.g., providing AEI-SAV intergrowths, AEN-UEI intergrowths, AFS-BPH intergrowths, BEC-ISV intergrowths, ITE-RTH intergrowths, KFI-SAV intergrowths, MTT-TO intergrowths, SBS-SBT intergrowths, and SSF-STF intergrowths, as well as materials comprising such intergrowths.

As will be detailed further herein below, the use of a method for the production of materials comprising intergrowths which does not employ halides advantageously leads to materials comprising intergrowths with little to no halide content. For example, in some embodiments, the disclosed intergrowths and intergrowth-containing materials, in as-prepared form, typically have less than about 1 ppm halide (e.g., fluoride), less than about 0.5 ppm halide, or no detectable halide.

Methods of Preparing Framework Intergrowths

The intergrowths and materials of the present disclosure are advantageously provided by a process as outlined herein. In particular embodiments, the present disclosure provides a method for the preparation of zeolite intergrowths and/or for materials with high AEI character that does not employ halide-containing compounds. The methods outlined herein can beneficially result in a high silica yield, which is traditionally not observed in the preparation of AEI framework zeolites.

To prepare a material comprising one or more zeolite intergrowths according to the disclosed methods, two or more different structure directing agent (SDAs), also referred to as a "templates" or "templating agents" are used. SDAs are organic molecules which guide or direct the molecular shape and pattern of the framework of the zeolite, e.g., serving as a scaffold around which the zeolite crystals form. After the crystals are formed, the SDA is removed from the interior structure of the crystals, leaving a molecularly porous aluminosilicate cage.

Specifically, the methods provided herein generally involve the use of at least one first SDA conventionally understood to lead to AEI-type frameworks and at least one second SDA conventionally understood to lead to CHA-type frameworks. The specific types of SDAs used can vary. In some embodiments, the first and second SDAs are independently selected from cyclic amines and/or ammonium compounds. In certain embodiments, the first SDA is a N,N-diethyl-2,6-dimethylpiperdinium compound (mixture or either of the cis/trans isomers), an N,N-dimethyl-2,6-dimethylpiperdinium compound (mixture or either of the cis/trans isomers), or a directing agent as disclosed in in J. Am. Chem. Soc., 2000, 122, p 263-273 and U.S. Pat. No. 5,958,370, which are incorporated herein by reference in their entireties. In certain preferred embodiments, the first SDA is 1,1,3,5-tetramethylpiperidinium hydroxide (TMP). In certain embodiments, the second SDA is selected from an N,N,N-trimethyl-1-adamantammonium compound, an N,N,N-trimethyl-2-adamantammonium compound, an N,N,N-trimethylcyclohexylammonium compound, an N,N-dimethyl-3,3-dimethylpiperidinium compound, an N,N-methylethyl-3,3-dimethylpiperidinium compound, an N,N-dimethyl-2-methylpiperidinium compound, a 1,3,3,6,6-pentamethyl-6-azonio-bicyclo(3.2.1)octane compound, N,N-dimethylcyclohexylamine, and bi- and tri-cyclic nitrogen containing organic compounds as disclosed in *Zeolites and Related Microporous Materials*: State of the Art 1994, Studies of Surface Science and Catalysis, Vol. 84, p 29-36; *Novel Materials in Hetrogeneous Catalysis* (ed. Baker and Murrell), Chapter 2, p 14-24, May 1990, J. Am. Chem. Soc., 2000, 122, p 263-273 and U.S. Pat. Nos. 4,544,538 and 6,709,644, which are incorporated herein by reference. In certain preferred embodiments, the second SDA is trimethyl-1-adamantylammonium hydroxide (TMAda).

As an exemplary description, the intergrowth-containing materials disclosed herein are prepared from a reaction mixture containing a source of water, silica, a source of aluminum, a source of hydroxide ions and at least two SDAs (namely, a first and second SDA) as referenced above, with no halide source. Generally, this mixture (also referred to herein as a "gel") has a high solids content (e.g., about 15% or greater or about 20% or greater). These components are mixed and crystallized. The mixing and crystallizing can be done at varying temperatures; in some embodiments, the mixing and/or crystallizing are done at room temperature. In some embodiments, the mixing is conducted at elevated temperature (e.g., greater than room temperature, such as about 25° C. to about 100° C.). In some embodiments, the crystallizing is done at decreased temperature (e.g., less than room temperature, such as about 0° C. to about 25° C.). The crystallizing conditions are generally selected so as to promote the formation of a solid precipitate containing zeolite crystals. The precipitate is filtered off and the remaining mother liquor is either discarded or can be recycled, e.g., as disclosed in U.S. Patent Application Publication No. 2015/0118150 to Yang et al., which is incorporated herein by reference.

The aluminum source can vary. In some embodiments, the aluminum source is non-zeolitic. For example, in certain embodiments, the aluminum source is selected from aluminum triisopropoxide or other alkoxides, aluminum hydroxides, aluminum oxides, or aluminum metal. As such, the methods provided herein advantageously do not employ a zeolite for the production of the intergrowths and materials of the present disclosure (although the method is not limited thereto, and in some embodiments, a zeolite can be used as the alumina source).

The silica source can vary as well. In various embodiments, the silica is provided by one or more of silicates, precipitated silica, colloidal silica, silica gels, silicon hydroxides, silicon alkoxides, fumed silica and alkali silicates. The source of hydroxide ions can vary and, in some embodiments, may be alkali metal hydroxides such as sodium hydroxide (NaOH), potassium hydroxide (KOH) or quaternary ammonium hydroxides such as tetramethyl ammonium hydroxide and OSDA hydroxides. In some embodiments, the hydroxide ion source is provided so as to ensure that the gel has a pH within a particular range. For example, in some embodiments, the pH is advantageously basic, e.g., about 12 to about 13. The methods outlined herein advantageously do not employ any halide-containing compounds (e.g., fluorides or compounds containing fluorine). Hydrofluoric acid (HF) has been employed in reaction mixtures for the provision of AEI-CHA intergrowths. In preferred embodiments, the methods of the present disclosure do not employ halogens or halide-containing compounds, e.g., do not employ fluorine or fluoride-containing compounds.

Figures 4A, 4B:
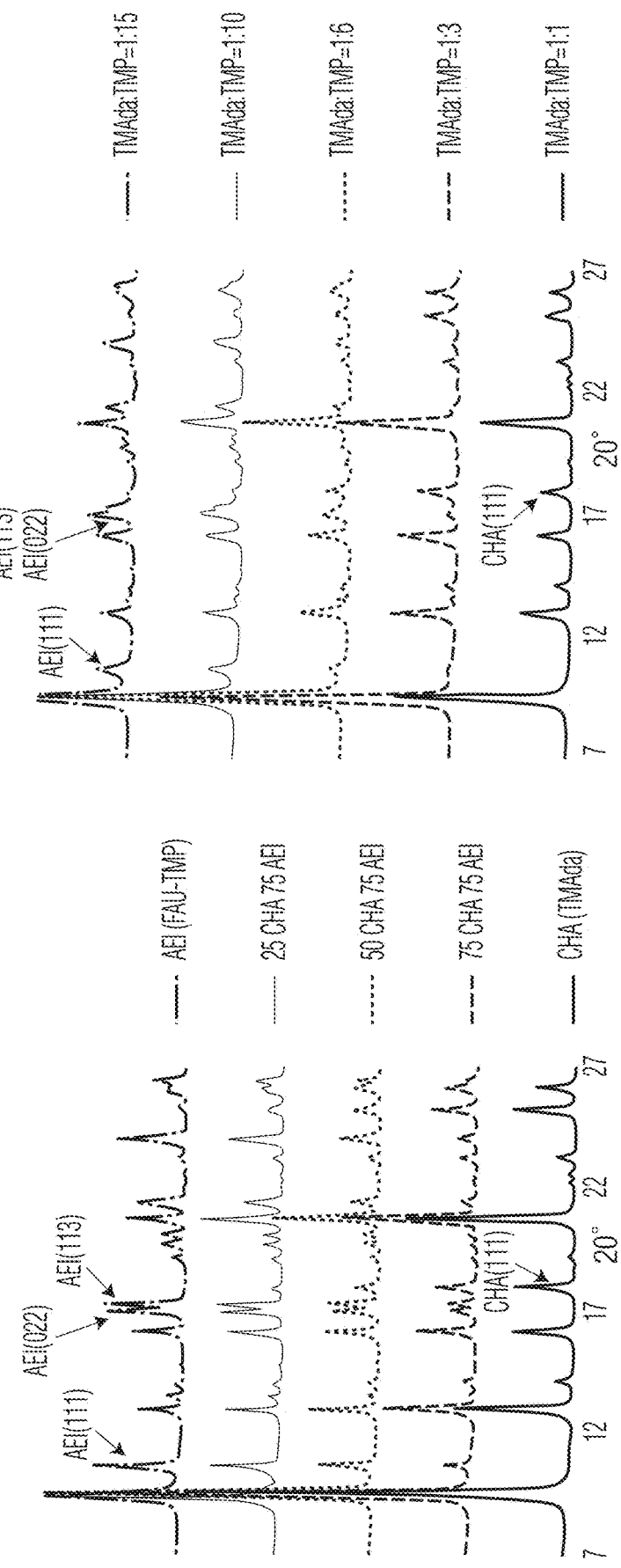
FIG. 4A is a powder diffraction pattern of physical mixtures of phase pure CHA and phase pure AEI.
FIG. 4B is a powder diffraction pattern of AEI-based materials comprising AEI-CHA intergrowths prepared according to the present disclosure, using a two-template method with varying TMAda:TMP ratios.

The diffraction patterns of CHA, FAU derived AEI and physical mixtures of the two materials (25-75%) are shown in FIG. 4A for comparative purposes. The diffraction patterns of various exemplary AEI-CHA intergrowth containing composition, prepared via a method as disclosed herein, are shown in FIG. 4B. The pattern obtained using 1:1 TMAda:TMP as SDA is consistent with phase pure CHA, and the AEI content, as shown, increases with TMP content of the gel from which the AEI-CHA intergrowth is prepared. However, as compared to the physical mixture of the two phases, peak broadening is observed. This broadening is particularly evident in the 2θ=10.68° reflection, corresponding to (111), (−111) planes as well as 2θ=16.99° and 17.29° reflections, corresponding to 022 and (113), (−113) planes respectively. Thus, although characteristic peaks of pure AEI and/or pure CHA phases are evident in the AEI-CHA intergrowths, peak broadening may be observed as evidence of intergrowth (rather than mixtures) of two such phases.

Figure 5A:
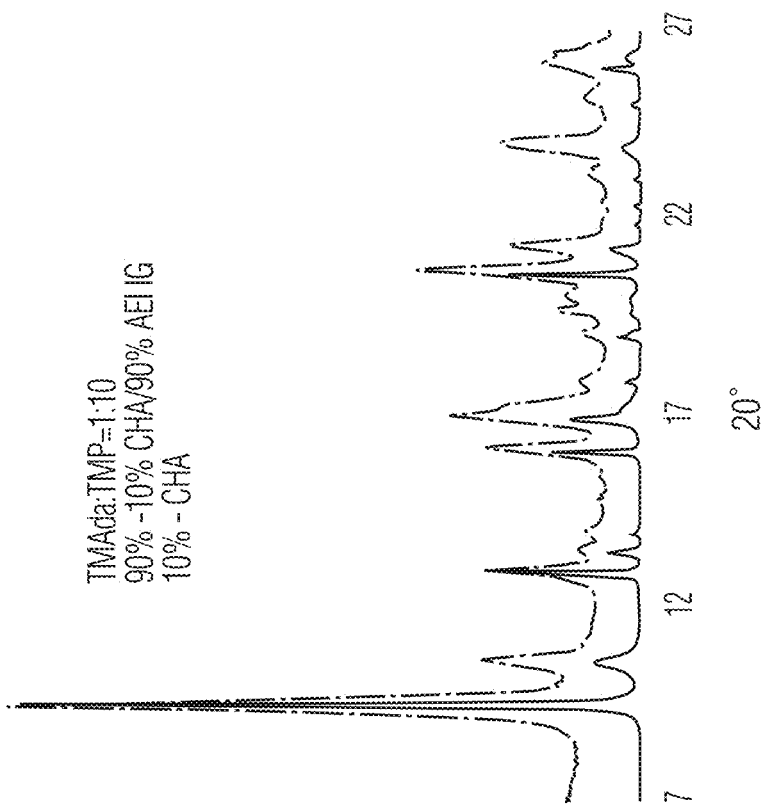
FIG. 5A is a normalized (to strongest reflection) diffraction pattern of an AEI-based material comprising AEI-CHA intergrowths prepared according to the present disclosure with TMAda:TMP=1:3 with corresponding linear combination of normalized simulated diffraction pattern of CHA and AEI-rich intergrowth (10% CHA stacking probability).
Figure 5B:
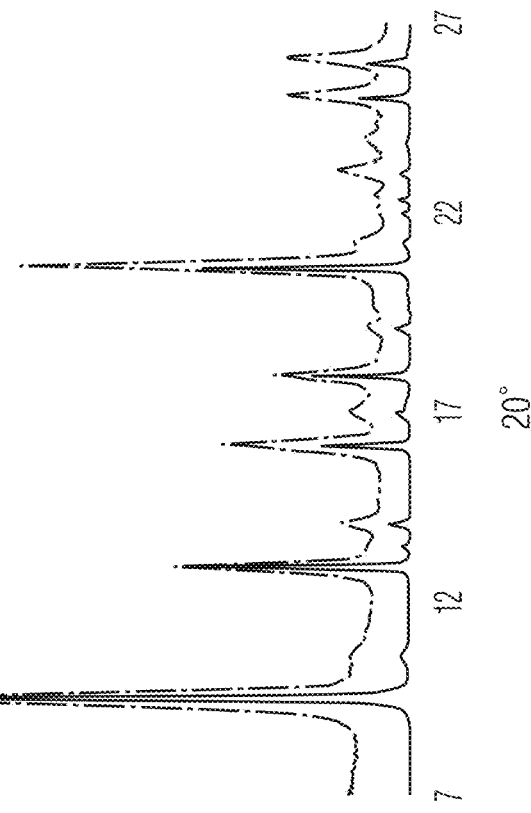
FIG. 5B is a normalized (to strongest reflection) diffraction pattern of an AEI-based material comprising AEI-CHA intergrowths prepared according to the present disclosure with TMAda:TMP=1:10 with corresponding linear combination of normalized simulated diffraction pattern of CHA and AEI-rich intergrowth (10% CHA stacking probability).

As shown in FIG. 3, a small increase of the stacking fault density in AEI (10% CHA diffraction pattern) result in significant broadening of the reflections corresponding to AEI (111), (−111) planes as well as (022) and (113), (−113) planes respectively. These features are also observed in the diffraction patterns of materials prepared according to the disclosed methods with a ratio of TMAda:TMP>1:1. Similarly, a small change in the stacking fault density of CHA (90%) results in a strong reduction of reflection corresponding to the CHA (111) plane, as observed in mixed template materials with TMAda:TMP>1:6. Taken together, these observations suggest that increasing TMP content leads to the formation of a high AEI character intergrowth with small amounts of a CHA phase, and that CHA dominates at lower TMP levels. Linear combinations of simulated AEI-rich intergrowth (10% CHA) and pure CHA diffraction patterns (intensity normalized to the strongest reflection) are shown in FIG. 5A, alongside measured patterns from two AEI-CHA intergrowth samples prepared according to the present disclosure (FIG. 5B). Combination patterns consisting of 80% CHA and 20% intergrowth and 10% CHA and 90% intergrowth provide good qualitative approximations to the patterns of TMAda:TMP=1:3 (5A) and TMAda:TMP=1:10 (5B) respectively.

The methods provided herein can, in some embodiments, be characterized as leading to substantially higher silica yield than methods conventionally used for preparing AEI zeolites (namely, methods based on conversion of FAU zeolites). Exemplary such syntheses are described, for example, in U.S. Pat. No. 5,958,370 to Zones et al., which is incorporated herein by reference. The methods of the present disclosure can, in some embodiments, be characterized by a silica yield of about 60% or greater, about 70% or greater, about 80% or greater, or even about 90% or greater. Silica yield=(weight of zeolite product after calcination X fraction of silica in zeolite product)/weight of silica in zeolite gel.

Catalytic Articles

Catalyst materials. To produce catalytic articles, a substrate as disclosed herein below is coated with a catalytic composition. The coatings are "catalytic coating compositions" or "catalytic coatings." The terms "catalyst composition" and "catalytic coating composition" are synonymous. In some embodiments, catalyst materials are provided according to the present disclosure, comprising one or more intergrowths as disclosed herein. As used herein, the term "catalyst" or "catalyst composition" refers to a material that promotes a reaction.

Typically, within a catalyst composition, the intergrowths are metal-promoted. As used herein, "promoted" refers to an intergrowth material as disclosed herein, comprising one or more components that are intentionally added, as opposed to comprising impurities that may be inherent in the material. The term "promoter metal" refers to one or more metals added to a molecular sieve, e.g., zeolite using ion exchange processes; that is, the promoter metal is exchanged with, for example, a hydrogen or ammonium or sodium ion located within the pores of the molecular sieve. The promoter metal is added to the molecular sieve to enhance the catalytic activity of the molecular sieve compared to molecular sieves that do not contain the promoter metal. The promoter metal actively participates in the promotion of a chemical reaction, e.g., copper participates in the conversion of nitrogen oxides, and is therefore often referred to as the active metal.

A promoter metal can be exchanged into the zeolite by a liquid phase exchange process, where the soluble metal ions exchange with the proton or ammonium or sodium ions associated with the zeolite. The exchange can also be carried out by a solid-state process, where promoter metal oxide or metal salt solid particles are mixed with a zeolite powder and processed under certain temperature and gas environments that may or may not contain steam. The exchange process can also be accomplished via an in-situ process during slurry preparation, where fine metal oxide particles are suspended in a zeolite slurry under conditions suitable for solid-liquid interaction. In some embodiments, prior to the exchange of a promoter metal into the AEI-CHA intergrowths disclosed herein, the intergrowths must be $NH^{4+}$ exchanged and calcined, as known in the art to obtain the $H^+$ form of the respective material.

Advantageously, the intergrowths disclosed herein are employed in catalyst materials for use in selective catalytic reduction ("SCR"). As used herein, the term "selective catalytic reduction" (SCR) refers to the catalytic process of reducing oxides of nitrogen to dinitrogen ($N_2$) using a nitrogenous reductant (e.g., ammonia, urea, and the like). In order to promote the SCR of oxides of nitrogen, in one or more embodiments according to the present disclosure, a suitable metal is exchanged into the intergrowths. Copper participates in the conversion of nitrogen oxides and thus may be a particularly useful metal for exchange. Accordingly, in particular embodiments, a catalyst composition is provided which comprises a copper-promoted AEI-CHA intergrowth. However, the invention is not intended to be limited thereto, and catalyst compositions comprising other metal-promoted molecular sieves are also encompassed hereby.

Promoter metals can generally be selected from the group consisting of alkali metals, alkaline earth metals, transition metals in Groups IIIB, IVB, VB, VIB, VIIB, VIIIB, IB, and IIB, Group IIIA elements, Group IVA elements, lanthanides, actinides, and combinations thereof. Certain promoter metals that can, in various embodiments, be used to prepare metal-promoted molecular sieves include, but are not limited to, cobalt (Co), nickel (Ni), lanthanum (La), manganese (Mn), iron (Fe), vanadium (V), silver (Ag), cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), tungsten (W), and combinations thereof. Combinations of such metals can be employed, e.g., copper and iron, giving a mixed Cu—Fe-promoted intergrowth, e.g., Cu—Fe-AEI-CHA. In certain embodiments, the promoter metal associated with the disclosed intergrowth comprises copper (e.g., as CuO), iron (e.g., as $Fe_2O_3$), or manganese (e.g., as $MnO_2$).

The promoter metal content of a metal-promoted intergrowth, calculated as the oxide, is, in one or more embodiments, at least about 0.1 wt. %, based on the total weight of the calcined intergrowth (including promoter) and reported on a volatile-free basis. In specific embodiments, the promoter metal of the intergrowth comprises Cu, and the Cu content, calculated as CuO is in the range of about 0.1 wt. % to about 20 wt. %, including about 0.5 wt. % to about 17 wt. %, about 2 wt. % to about 15 wt. %, or about 2 wt. % to about 10 wt. %, in each case based on the total weight of the calcined intergrowth reported on a volatile free basis. In some embodiments, the intergrowth (including promoter metal) can be defined by the ratio of promoter metal to aluminum within the promoted intergrowth. For example, in some embodiments, the promoter metal to aluminum weight ratio is about 0.1 to about 0.5 (e.g., the Cu/Al ratio is about 0.1 to about 0.5).

Advantageously, in certain embodiments, metal-promoted intergrowths provided according to the present disclosure, e.g., metal-promoted AEI-CHA intergrowths, exhibit SCR performance comparable to AEI-based materials. As such, in some embodiments, the present disclosure provides a method for preparing a catalyst material suitable for SCR reaction with $NO_x$, e.g., from exhaust gas produced by an internal combustion engine.

Substrate. According to one or more embodiments, a catalytic article is provided by disposing a catalyst composition as disclosed above (including an AEI-CHA intergrowth, and preferably, a metal-promoted AEI-CHA intergrowth) on a substrate. Useful substrates are 3-dimensional, having a length and a diameter and a volume, similar to a cylinder. The shape does not necessarily have to conform to a cylinder. The length is an axial length defined by an inlet end and an outlet end.

The substrate for the catalyst composition comprising the intergrowth material disclosed herein may be constructed of any material typically used for preparing automotive catalysts and will typically comprise a metal or ceramic honeycomb structure. The substrate typically provides a plurality of wall surfaces upon which a catalyst composition comprising the intergrowth material disclosed herein is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface. Ceramic materials used to construct the substrate may include any suitable refractory material, e.g., cordierite, cordierite-α alumina, silicon nitride, zircon mullite, spodumene, alumina-silica magnesia, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. In some embodiments, the substrate may be an asymmetrical cell wall flow substrate wherein the inlet cells have a different size than the outlet cells. However, it will be understood that the invention is not limited to a particular substrate type, material, or geometry. Note that where the substrate is a wall-flow substrate, the catalyst composition can permeate into the pore structure of the porous walls (i.e., partially or fully occlude the pore openings) in addition to being disposed on the surface of the walls.

Figure 6A:
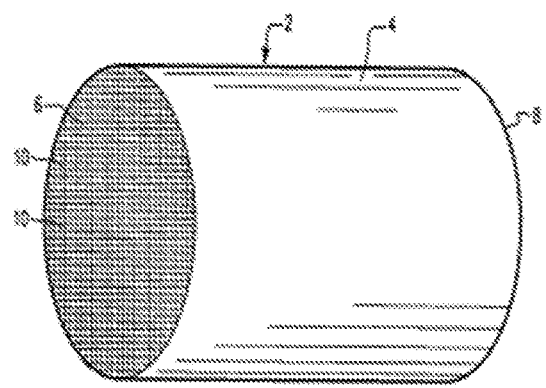
FIG. 6A is a perspective view of a honeycomb-type substrate which may comprise a washcoat composition in accordance with the present invention.
Figure 6B:
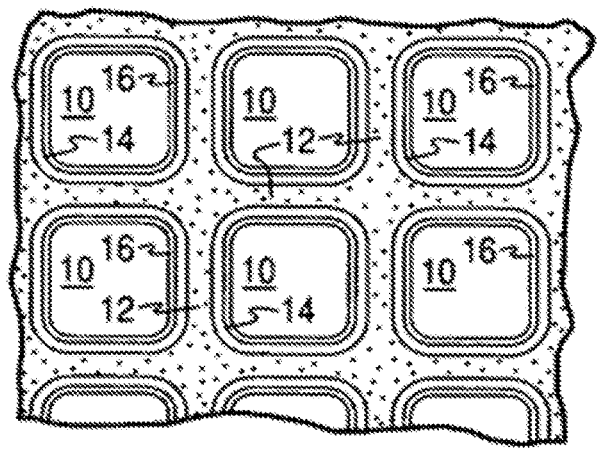
FIG. 6B is a partial cross-sectional view enlarged relative to FIG. 6A and taken along a plane parallel to the end faces of the carrier of FIG. 6A, which shows an enlarged view of a plurality of the gas flow passages shown in FIG. 6A.

FIGS. 6A and 6B illustrate an exemplary substrate 2 in the form of a flow-through substrate coated with a washcoat composition as described herein. Referring to FIG. 6A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 6B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 6B, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the illustrated two-layer embodiment.

Figure 7:
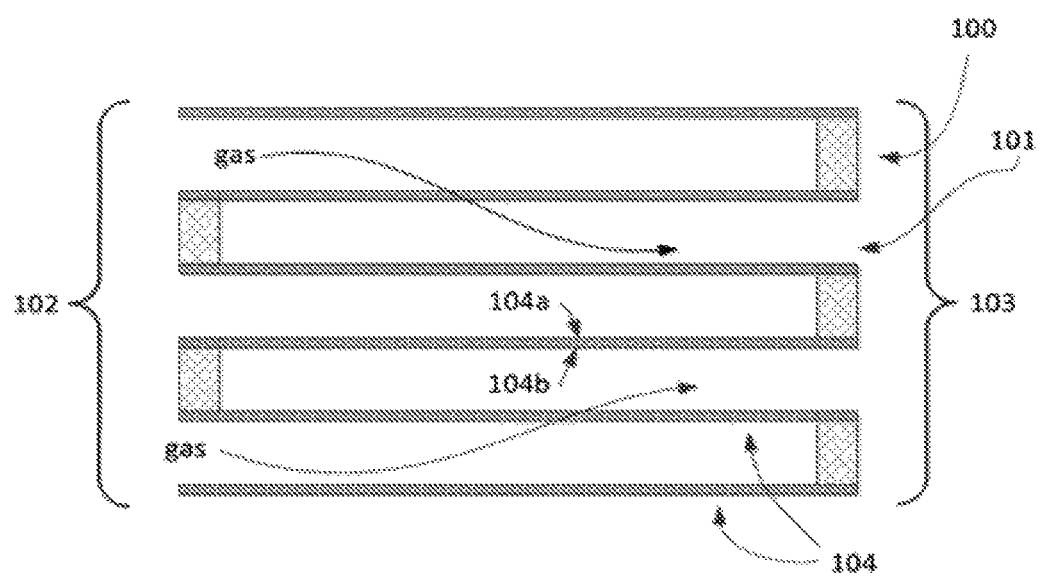
FIG. 7 is a cutaway view of a section enlarged relative to FIG. 6A, wherein the honeycomb-type substrate in FIG. 6A represents a wall-flow filter.

FIG. 7 illustrates a perspective view of an exemplary substrate in the form a wall flow filter substrate coated with a washcoat composition as described herein. A cross-section view of a monolithic wall-flow filter substrate section is illustrated in FIG. 7, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104a and outlet side 104b. The passages are enclosed by the cell walls. A porous wall flow filter as provided by this disclosure is catalyzed in that the wall of said substrate has thereon or contained therein one or more catalytic materials, namely, the catalyst composition disclosed herein above, comprising an AEI-CHA intergrowth. Catalytic materials may be present on the inlet side of the substrate wall alone, the outlet side alone, or both the inlet and outlet sides. This disclosure includes the use of one or more layers of catalytic material within the wall as well as on the inlet and/or outlet walls of the substrate.

In describing the quantity of washcoat or catalytic metal component or other component of the composition, it is convenient to use units of weight of component per unit volume of catalyst substrate. Therefore, the units, grams per cubic inch ("g/in$^3$") and grams per cubic foot ("g/ft$^3$"), are used herein to mean the weight of a component per volume of the substrate, including the volume of void spaces of the substrate. The total loading of the catalyst composition(s) on the catalyst substrate, such as a monolithic flow-through substrate, is typically from about 0.5 to about 6 g/in$^3$, and more typically from about 1 to about 5 g/in$^3$. It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

Article. A substrate is coated with a catalytic composition to form a catalytic article. The catalytic coating may comprise one or more thin, adherent coating layers disposed on and in adherence to least a portion of a substrate. In some embodiment, the present catalytic articles may include the use of one or more catalyst layers and combinations of one or more catalyst layers. Catalytic materials may be present on the inlet side of the substrate wall alone, the outlet side alone, both the inlet and outlet sides, or the wall itself may consist all, or in part, of the catalytic material. The catalytic coating may be on the substrate wall surfaces and/or in the pores of the substrate walls, that is "in" and/or "on" the substrate walls. Thus, the phrase "a catalytic coating disposed on the substrate" means on any surface, for example on a wall surface and/or on a pore surface.

The above-noted catalyst composition is mixed with water to form a slurry for purposes of coating a catalyst substrate, such as a honeycomb-type substrate. In addition to the catalyst particles, the slurry may optionally contain alumina as a binder, hydrocarbon (HC) storage components (e.g., zeolite), water-soluble or water-dispersible stabilizers (e.g., barium acetate), promoters (e.g., lanthanum nitrate), associative thickeners, and/or surfactants (including anionic, cationic, non-ionic or amphoteric surfactants).

The slurry can be milled to enhance mixing of the particles and formation of a homogenous material and, in particular, to reduce particle size. The milling can be accomplished in a ball mill, continuous mill, or other similar equipment, and the solids content of the slurry may be, e.g., about 20 to about 60 wt. %, more particularly about 30 to about 40 wt. %. In one embodiment, the post-milling slurry is characterized by a D90 particle size of about 10 to about 20 microns. The D90 is defined as the particle size at which about 90% of the particles have a finer particle size.

The slurry is then coated on the catalyst substrate using any washcoat technique known in the art. As used herein, the term "washcoat" has its usual meaning in the art of a thin, adherent coating of a catalytic material applied to a substrate. In one embodiment, the catalyst substrate is dipped one or more times in the slurry or otherwise coated with the slurry. Thereafter, the coated substrate is dried at an elevated temperature (e.g., 100-150° C.) for a period of time (e.g., 10 min-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

The washcoat(s) can be applied such that different coating layers may be in direct contact with the substrate. Alternatively, one or more "undercoats" may be present, so that at least a portion of a catalytic or sorbent coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat" the gap between the different layers is termed an "interlayer." An undercoat is a layer "under" a coating layer, an overcoat is a layer "over" a coating layer and an interlayer is a layer "between" two coating layers. The interlayer(s), undercoat(s) and overcoat(s) may contain one or more catalytic/functional compositions or may be free of functional compositions.

The catalytic coating may comprise more than one thin adherent layer, the layers in adherence to each other and the coating in adherence to the substrate. The entire coating comprises the individual "coating layers". The catalytic coating may advantageously be "zoned", comprising zoned catalytic layers. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60% or about 70% of the substrate length.

Different layers may each extend the entire length of the substrate or may each extend a portion of the length of the substrate and may overlay or underlay each other, either partially or entirely. Each of the different layers may extend from either the inlet or outlet end.

Exhaust Gas Treatment Systems

The present disclosure further provides an exhaust gas treatment system for reducing a NO$_x$ level in an exhaust gas stream from an internal combustion engine, the exhaust gas treatment system comprising a catalytic article as disclosed herein. In another aspect of the present invention is provided a method for reducing a NO$_x$ level in an exhaust gas stream from an internal combustion engine, the method comprising contacting the exhaust gas stream with a catalytic article as disclosed herein, or an emission treatment system as disclosed herein. The present invention therefore provides an emission treatment system that incorporates the catalytic articles described herein, such as an emission treatment system generally comprising an engine producing an exhaust gas stream and one or more catalytic articles positioned downstream from the engine in fluid communication with the exhaust gas stream. The engine can be, e.g., a diesel engine which operates at combustion conditions with air in excess of that required for stoichiometric combustion, i.e. lean conditions. In other embodiments, the engine can be an engine associated with a stationary source (e.g., electricity generators or pumping stations). In some embodiments, the emission treatment system further comprises one or more additional catalytic components. The relative placement of the various catalytic components present within the emission treatment system can vary.

In the present exhaust gas treatment systems and methods, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

The present articles, systems and methods are suitable for treatment of exhaust gas streams from mobile emissions sources such as trucks and automobiles. The present articles, systems and methods are also suitable for treatment of exhaust streams from stationary sources such as power plants.

Advantageously, as demonstrated in the Example, the present disclosure provides a method of preparing a material with SCR activity comparable to that of conventional AEI, prepared via a FAU alumina source, while significantly increasing the efficiency of production of the catalytic material. As described herein, the significantly higher silica yield associated with the production of AEU-CHA intergrowths and the comparable SCR activity afforded by such intergrowths render them suitable replacements for conventionally prepared AEI zeolites.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

EMBODIMENTS

The following embodiments further illustrate the invention of the present disclosure.

In embodiment 1, the present disclosure provides a method of making an AEI-based material, comprising: preparing a mixture of water, an alumina source, a silica source, a CHA structure directing agent, and an AEI structure directing agent, wherein the molar ratio of the CHA structure directing agent to the AEI structure directing agent is from about 1:1 to about 1:15; heating the mixture at a first temperature sufficient to promote formation of crystals; and calcining the crystals at a second temperature of from about 450° C. to about 750° C. to obtain the AEI-based material, wherein no halide-containing reagent is employed.

In embodiment 2, the present disclosure provides a method of improving efficiency of producing an AEI-based material, comprising: preparing a mixture of water, an alumina source, a silica source, a CHA structure directing agent, and a AEI structure directing agent, wherein the molar ratio of the CHA structure directing agent to the AEI structure directing agent is from about 1:1 to about 1:15; heating the mixture at a temperature sufficient to promote formation of crystals; and calcining the crystals at a second temperature of from about 450° C. to about 750° C., wherein no halide-containing reagent is employed.

In embodiment 3, the present disclosure provides the method of any one of the preceding embodiment, wherein the CHA structure directing agent is selected from the group consisting of an N,N,N-trimethyl-1-adamantammonium compound, an N,N,N-trimethyl-2-adamantammonium compound, an N,N,N-trimethylcyclohexylammonium compound, an N,N-dimethyl-3,3-dimethylpiperidinium compound, an N,N-methylethyl-3,3-dimethylpiperidinium compound, an N,N-dimethyl-2-methylpiperidinium compound, a 1,3,3,6,6-pentamethyl-6-azonio-bicyclo(3.2.1)octane compound, N,N-dimethylcyclohexylamine, bi- and tricyclic nitrogen containing organic compounds, and combinations thereof.

In embodiment 4, the present disclosure provides the method of embodiment 3, wherein the CHA structure directing agent is trimethyl-1-adamantylammonium hydroxide (TMAda).

In embodiment 5, the present disclosure provides the method of any one of the preceding embodiments, wherein the AEI structure directing agent is a N,N-diethyl-2,6-dimethylpiperdinium compound, a N,N-dimethyl-2,6-dimethylpiperdinium compound, or a combination thereof.

In embodiment 6, the present disclosure provides the method of embodiment 5, wherein the AEI structure directing agent is 1,1,3,5-tetramethylpiperidinium hydroxide (TMP).

In embodiment 7, the present disclosure provides the method of any one of the preceding embodiments, wherein the solids content is from about 12% to about 30% or from about 17% to about 20%.

In embodiment 8, the present disclosure provides the method of any one of the preceding embodiment, wherein the method provides a higher silica yield incorporation than conventional methods.

In embodiment 9, the present disclosure provides the method of any one of the preceding embodiments, wherein the method provides a silica yield of about 50% or greater.

In embodiment 10, the present disclosure provides the method of any one of the preceding embodiments, wherein the method provides a silica yield of about 75% or greater.

In embodiment 11, the present disclosure provides the method of any one of the preceding embodiments, wherein the method provides a silica yield of about 90% or greater.

In embodiment 12, the present disclosure provides the method of any one of the preceding embodiments, wherein the method provides a silica yield of from about 92% to about 94%.

In embodiment 13, the present disclosure provides the method of any one of the preceding embodiments, wherein the first temperature is from about 140° C. to about 200° C.

In embodiment 14, the present disclosure provides the method of any one of the preceding embodiments, further comprising filtering the crystals formed during the heating step.

In embodiment 15, the present disclosure provides the method of any one of the preceding embodiments, wherein the alumina source is non zeolitic.

In embodiment 16, the present disclosure provides the method of any of embodiments 1-14, wherein the alumina source is zeolitic.

In embodiment 17, the present disclosure provides the method of any one of the preceding embodiments, wherein the alumina source is selected from the group consisting of aluminum alkoxides (e.g., aluminum triisopropoxide), aluminum hydroxides, aluminum oxides, and aluminum metal.

In embodiment 18, the present disclosure provides the method of any one of the preceding embodiments, wherein the mixture is prepared under basic pH conditions.

In embodiment 19, the present disclosure provides the method of embodiment 18, wherein the pH is about 12 to about 13.

In embodiment 20, the present disclosure provides the method of any one of the preceding embodiments, wherein the silica source is selected from the group consisting of silicates, precipitated silica, colloidal silica, silica gels, dealuminated zeolites, silicon hydroxides, silicon alkoxides, fumed silica, and combinations thereof.

In embodiment 21, the present disclosure provides the method of any one of the preceding embodiments, wherein the heating step comprises heating the mixture for about 30 to about 80 hours.

In embodiment 22, the present disclosure provides the method of any one of the preceding embodiments, wherein the AEI-based material comprises about 5% to about 85% by weight of pure CHA and about 15% to about 95% by weight of AEI-CHA intergrowths.

In embodiment 23, the present disclosure provides the method of any one of the preceding embodiments, wherein the AEI-based material comprises AEI-CHA intergrowths having at least 90% AEI character.

In embodiment 24, the present disclosure provides the method of any one of the preceding embodiments, wherein the AEI-based material has a ZSA of about 500 to about 550 m$^2$/g.

In embodiment 25, the present disclosure provides the method of any one of the preceding embodiments, wherein the AEI-based material has a SAR of about 10 to about 25.

In embodiment 26, the present disclosure provides the method of any one of the preceding embodiments, further comprising exchanging a promoter metal into the product.

In embodiment 27, the present disclosure provides the method of embodiment 19, wherein the promoter metal is selected from Cu, Co, Ni, La, Mn, Fe, V, Ag, Ce, Nd, Mo, Hf, Y, W, and combinations thereof.

In embodiment 28, the present disclosure provides the method of embodiment 26 or 27, wherein the amount of promoter metal present in the AEI-based material is about 0.01 wt. % to about 15 wt. % based on the weight of the metal-promoted AEI-based material.

In embodiment 29, the present disclosure provides the method of any one of the preceding embodiments, further comprising formulating the AEI-based material into a SCR catalyst composition.

In embodiment 30, the present disclosure provides a method of reducing NOx in an exhaust gas stream, comprising contacting the exhaust gas stream with a SCR catalyst composition comprising the AEI-based material prepared according to the method of any one of embodiments 1-29, wherein the SCR catalyst composition reduces NOx levels in the exhaust gas stream by at least 50%.

In embodiment 31, the present disclosure provides an AEI-based material prepared according to the method of any one of embodiments 1-28, wherein the AEI-based material comprises about 15% to about 95% by weight of an AEI-CHA intergrowth and about 5% to about 85% by weight of pure CHA, wherein the AEI-CHA intergrowth has an AEI character of about 75% to about 95%.

In embodiment 32, the present disclosure provides an SCR catalyst composition comprising the AEI-based material of embodiment 31.

EXAMPLE

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

Preparation Chabazite (CHA) was crystallized from a gel consisting of aluminum triisopropoxide, colloidal silica (AS-40), NaOH, and trimethy-1-adamantylammonium hydroxide (TMAda) as the organic structure directing agent (OSDA). AEI was crystallized, using colloidal silica and partially dealuminated FAU (SAR=5.2, Zeolyst CVB-500) as the aluminum source and 1,1,3,5-tetramethylpiperidinium hydroxide (TMP) as the OSDA. After crystallization, each material was filtered, washed with deionized water and calcined in air at 540° C.

An AEI-CHA containing intergrowth material was prepared from a gel composition similar to that used in CHA synthesis (see Example 1 above), except that a mixture of TMAda and TMP was used as the OSDA, with ratios ranging from 1:1 to 1:15 TMAda:TMP. After crystallization, the material was filtered, washed and calcined in air at 540° C. Recipe and product properties are summarized in Table 1, where R represents the OSDA.

TABLE 1

Recipes for CHA, AEI and AEI-CHA Intergrowth Material Synthesis

| Recipe | Recipe Properties* | | | | | | |
|---|---|---|---|---|---|---|---|
| | SiO$_2$/Al$_2$O$_3$ | Na/Si | R/Si | OH/Si | Solids (%) | Temp (° C.) | Time (h) |
| CHA (TMAda) | 14.8 | 0.15 | 0.108 | 0.26 | 12 | 160° C. | 30 |
| TMAda:TMP 1:1 | 14.8 | 0.18 | 0.14 | 0.32 | 22 | 170° C. | 72 |
| TMAda:TMP 1:3 | 14.8 | 0.18 | 0.14 | 0.32 | 22 | 170° C. | 72 |
| TMAda:TMP 1:6 | 14.8 | 0.18 | 0.14 | 0.32 | 22 | 170° C. | 72 |
| TMAda:TMP 1:10 | 14.8 | 0.18 | 0.14 | 0.32 | 22 | 170° C. | 72 |
| TMAda:TMP 1:15 | 14.8 | 0.18 | 0.14 | 0.32 | 22 | 170° C. | 72 |
| AEI (TMP-FAU) | 45.0 | 0.46 | 0.14 | 0.60 | 8 | 140° C. | 72 |

*All crystallizations carried out in 300 mL autoclaves with 250 rpm stirring

TABLE 2

Product properties for CHA, AEI and mixed template synthesis

| Recipe | Product Properties | | |
|---|---|---|---|
| | $SiO_2/Al_2O_3$ | $ZSA(m^2/g)$ | Silica Yield (%) ** |
| CHA (TMAda) | 13.8 | 524 | 93 |
| TMAda:TMP 1:1 | 13.62 | 542 | 92 |
| TMAda:TMP 1:3 | | 515 | |
| TMAda:TMP 1:6 | 13.84 | 507 | 94 |
| TMAda:TMP 1:10 | 13.6 | 501 | 92 |
| TMAda:TMP 1:15 | | 504 | |
| AEI (TMP-FAU) | 17 | 484 | 38 |

** yield based on gel and product SARs, assuming complete alumina conversion

For CHA and AEI-CHA intergrowth material recipes, the gel and product SARs were similar (~14) and the overall silica yield exceeded 90%. By contrast, the gel SAR for AEI synthesis is nearly three times that found in the AEI product, and accordingly a 38% silica yield was obtained using the conventional AEI process. Furthermore, the solids content used in the AEI-CHA intergrowth material synthesis is doubled, compared to that used in CHA or AEI synthesis. Zeolitic surface areas (ZSA) measured for CHA and AEI are characteristic of highly crystalline materials of the respective frameworks, and the ZSAs of the AEI-CHA intergrowth material materials fall in this range. Synthesis with TMAda:TMP ratios higher than 15 did not yield a crystalline phase, whereas ratios of 1:1 and lower yielded phase pure CHA.

The phase composition was determined by X-ray Diffraction. The samples were ground using a mortar and pestle and then backpacked into a flat mount sample holder. A PANalytical MPD X'Pert Pro diffraction system was used for data collection. A copper anode tube (Wavelength: Cu Kα1=1.54060 Å) was operated at 45 kV and 40 mA. The Bragg-Brentano configuration was employed, and data was acquired from 3° to 80° 2θ with a step size of 0.016° and a count-time of 60 s/step. Phase identification and peak fitting was done using Jade Plus software version 9.5.0 and the PDF-4+2015 (powder diffraction file) database from the ICDD (International Center for Diffraction Data).

As referenced above, powder diffraction patterns of CHA, AEI and physical mixtures of the two materials (25-75%) are shown in FIG. 4A for comparative purposes. As shown in FIG. 4A, the diffraction patterns of the physical mixtures can be described as linear combinations of the diffraction patterns of the respective pure phases, which are characterized be sharp diffraction peaks. Powder diffraction patterns of AEI-CHA intergrowth containing materials are shown in FIG. 4B. The pattern of the material prepared with a TMAda:TMP ratio of 1:1 is consistent with phase pure CHA (compare with FIG. 4A). The AEI content increases as the TMAda:TMP ratio used to prepare the material is decreased (i.e., the TMP content is increased). However, as compared to the physical mixture of the two phases, peak broadening is observed. As shown, this broadening is particularly evident in the 2θ=10.68° reflection, corresponding to (111), (−111) planes as well as 2θ=16.99° and 17.29° reflections, corresponding to 022 and (113), (−113) planes respectively. This peak broadening indicates increasing disorder in the respective crystallographic direction, as might be observed in intergrowths or other defect rich materials.

Figure 8:
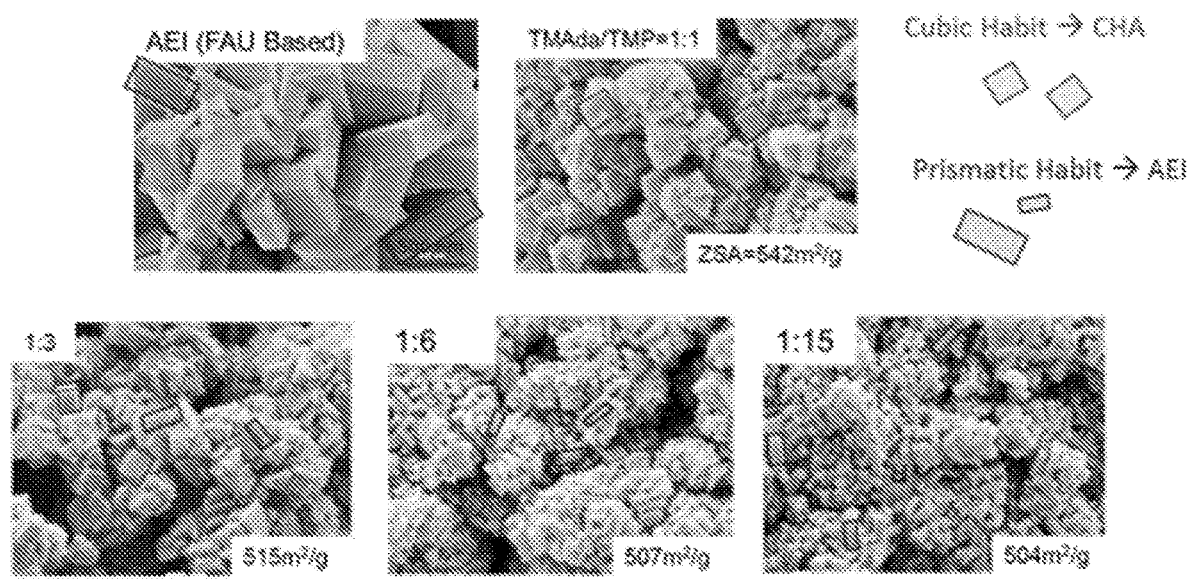
FIG. 8 provides scanning electron micrographs of conventionally prepared AEI zeolites (from FAU) and AEI-based material comprising AEI-CHA intergrowths prepared according to the present disclosure with varying TMAda:TMP ratios.

Further evidence for the intergrowth composition of the materials derived from TMAda:TMP synthesis is provided by their electron micrographs, as seen in FIG. 8. A prismatic habit is observed in the primary crystallites of pure AEI (FAU-based), whereas CHA (derived from TMAda:TMP=1:1) is composed of aggregates of smaller primary crystallites displaying a cubic habit. The TMAda:TMP=1:3 material is composed of both cubic and prismatic crystallites, of similar size (200 nm), suggesting a physical mixture of CHA and an AEI-rich phase. However, materials formed from TMAda:TMP≥1:6, appear to contain only prismatic primary crystallites, suggesting a dominant AEI-rich phase.

Figure 9A:
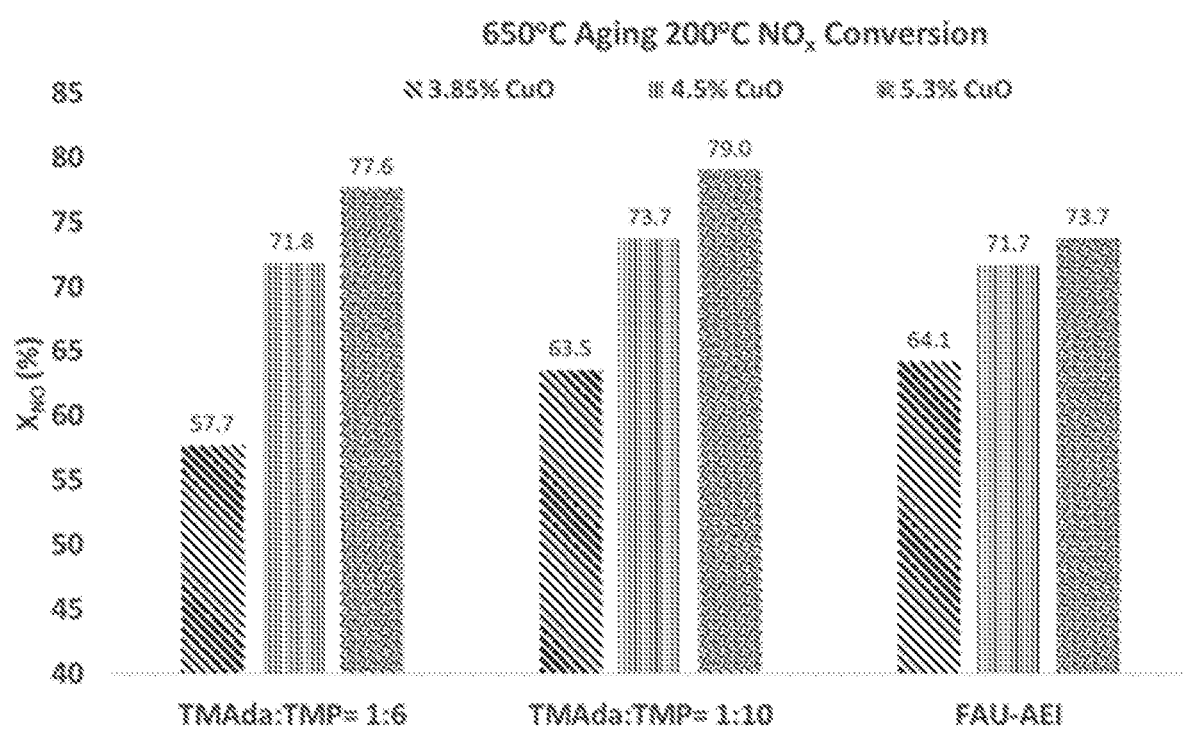
FIG. 9A provides SCR activity (NO conversion) after 650° C. aging (16 h, 10% $H_2O$) at 200° C. for copper-modified AEI-CHA intergrowths prepared according to the present disclosure with varying TMAda:TMP ratios and varying copper content.
Figure 9B:
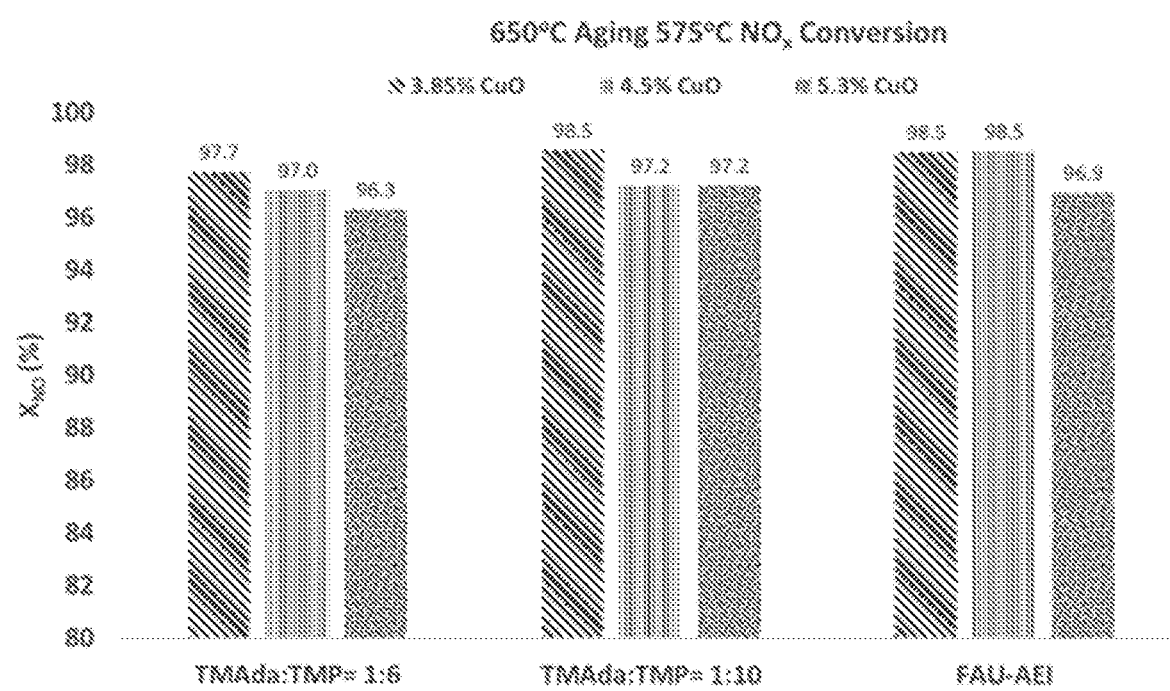
FIG. 9B provides SCR activity (NO conversion) after 650° C. aging (16 h, 10% $H_2O$) at 650° C. for copper-modified AEI-based material comprising AEI-CHA intergrowths prepared according to the present disclosure with varying TMAda:TMP ratios and varying copper content.

Catalytic (SCR) activity Prior to SCR testing, selected AEI-CHA intergrowth materials and FAU-based AEI (prepared as above) were $NH_4^+$ exchanged (80° C.) at a ratio of 10:1 $NH_4NO_3$, dried (12 h at 90° C.), and calcined (6 h at 540° C.) to obtain the $H^+$ form of the materials. The materials were impregnated with a $Cu(NO_3)_2$ solution to achieve loading of 3.85, 4.5 and 5.3 wt. % CuO and calcined at 540° C. Subsequently, the materials were slurried with $ZrO(OAc)_2$ binder (5 wt. % $ZrO_2$) and dried under stirring. A commercial CHA material was the reference. Prior to testing, the samples were aged 650° C. for 16 h in 10% $H_2O$ in static air. Samples were tested as 120 mg Cu-CHA per reactor diluted with corundum of the same sieve fraction to ~1 mL bed volume. The feed gas was GHSV 80,000 $h^{-1}$, 500 ppm NO, 500 ppm $NH_3$, 5% $H_2O$, 10% $O_2$, balance $N_2$. The activities for NO conversion at 200° C. and 575° C. are shown in FIG. 9. Low temperature performance increased for all CuO loadings as TMAda:TMP increase from 1:6 to 1:10. The performance of the TMAda:TMP 1:10 was very similar to that of FAU-based AEI. All materials showed similar high ($X_{NO}$>95%) performance at 575° C.

This activity results suggest that AEI-rich intergrowths (high AEI character), as described in the present disclosure, have similar SCR performance to AEI prepared by conventional methods (e.g., using FAU as the alumina source). However, the present disclosure outlines various beneficial features associated with the AEI-CHA intergrowth over convention AEI zeolites, e.g., including a substantially higher silica yield associated with production, and therefore superior scalability, implementation, and integration into current crystallization assets.

What is claimed is:

1. A method of making a zeolite comprising an AEI/CHA intergrowth material, comprising:
    preparing a mixture of water, an alumina source, a silica source, a CHA structure directing agent, and an AEI structure directing agent, wherein the molar ratio of the CHA structure directing agent to the AEI structure directing agent ranges from about 1:1 to about 1:15;
    heating the mixture at a first temperature sufficient to promote formation of crystals; and
    calcining the crystals at a second temperature ranges from about 450° C. to about 750° C. to obtain the AEI/CHA intergrowth material,
    wherein no halide-containing reagent is employed.

2. The method of claim 1, wherein the CHA structure directing agent is chosen from an N,N,N-trimethyl-1-adamantammonium compound, an N,N,N-trimethyl-2-adamantammonium compound, an N,N,N-trimethylcyclohexylammonium compound, an N,N-dimethyl-3,3-dimethylpiperidinium compound, an N,N-methylethyl-3,3-dimethylpiperidinium compound, an N,N-dimethyl-2-methylpiperidinium compound, a 1,3,3,6,6-pentamethyl-6-azonio-bicyclo(3.2.1)octane compound, N,N-dimethylcyclohexylamine, bi- and tri-cyclic nitrogen containing organic compounds, and combinations thereof.

3. The method of claim 2, wherein the CHA structure directing agent is trimethyl-1-adamantylammonium hydroxide (TMAda).

4. The method of claim 1, wherein the AEI structure directing agent is a N,N-diethyl-2,6-dimethylpiperdinium compound, a N,N-dimethyl-2,6-dimethylpiperdinium compound, or a combination thereof.

5. The method of claim 4, wherein the AEI structure directing agent is 1,1,3,5-tetramethylpiperidinium hydroxide (TMP).

6. The method of claim 1, wherein the solids content ranges from about 12% to about 30%.

7. The method of claim 1, wherein the method provides a silica yield of about 50%.

8. The method of claim 1, wherein the first temperature ranges from about 140° C. to about 200° C.

9. The method of claim 1, further comprising filtering the crystals formed during the heating step.

10. The method of claim 1, wherein the alumina source is non zeolitic or zeolitic, or chosen from aluminum alkoxides, aluminum hydroxides, aluminum oxides, and aluminum metal.

11. The method of claim 1, wherein the alumina source is chosen from aluminum alkoxides, aluminum hydroxides, aluminum oxides, and aluminum metal.

12. The method of claim 1, wherein the mixture is prepared under basic pH conditions.

13. The method of claim 12, wherein the pH ranges from about 12 to about 13.

14. The method of claim 1, wherein the silica source is chosen from silicates, precipitated silica, colloidal silica, silica gels, dealuminated zeolites, silicon hydroxides, silicon alkoxides, fumed silica, and combinations thereof.

15. The method of claim 1, wherein the heating step comprises heating the mixture for about 30 hours to about 80 hours.

16. The method of claim 1, wherein the zeolite comprises from about 5 wt. % to about 85 wt. % by weight of pure CHA and from about 15 wt. % to about 95 wt. % by weight of AEI-CHA intergrowths.

17. The method of claim 1, wherein the zeolite comprises AEI-CHA intergrowths having at least 90% AEI character.

18. The method of claim 1, wherein the zeolite has a zeolitic surface area (ZSA) from about 500 $m^2$/g to about 550 $m^2$/g.

19. The method of claim 1, wherein the zeolite has a silica to alumino molar ratio (SAR) from about 10 to about 25.

20. The method of claim 1, further comprising exchanging a promoter metal into the zeolite.

21. The method of claim 20, wherein the promoter metal is chosen from Cu, Co, Ni, La, Mn, Fe, V, Ag, Ce, Nd, Mo, Hf, Y, W, and combinations thereof.

22. The method of claim 20, wherein the amount of the promoter metal present in the zeolite ranges from about 0.01 wt. % to about 15 wt. % based on the weight of the metal-promoted zeolite.

23. The method of claim 1, further comprising formulating the zeolite into a selective catalytic reduction (SCR) catalyst composition.

* * * * *